J. A. FREEZE.
AUTOMOBILE SWITCH.
APPLICATION FILED AUG. 1, 1917.

1,381,409.

Patented June 14, 1921.
5 SHEETS—SHEET 1.

INVENTOR
John A. Freeze
BY Onar Gill
HIS ATTORNEY

J. A. FREEZE.
AUTOMOBILE SWITCH.
APPLICATION FILED AUG. 1, 1917.
1,381,409.
Patented June 14, 1921.
5 SHEETS—SHEET 2.
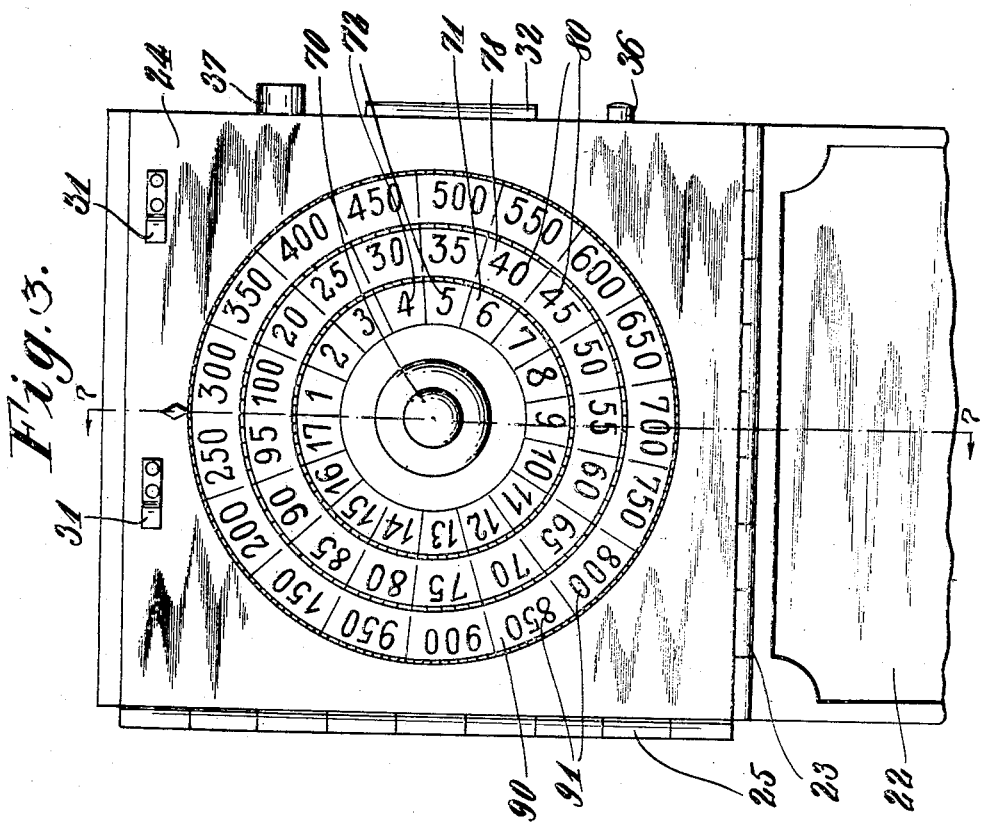
INVENTOR
John A. Freeze.
BY Oscar Gill
HIS ATTORNEY

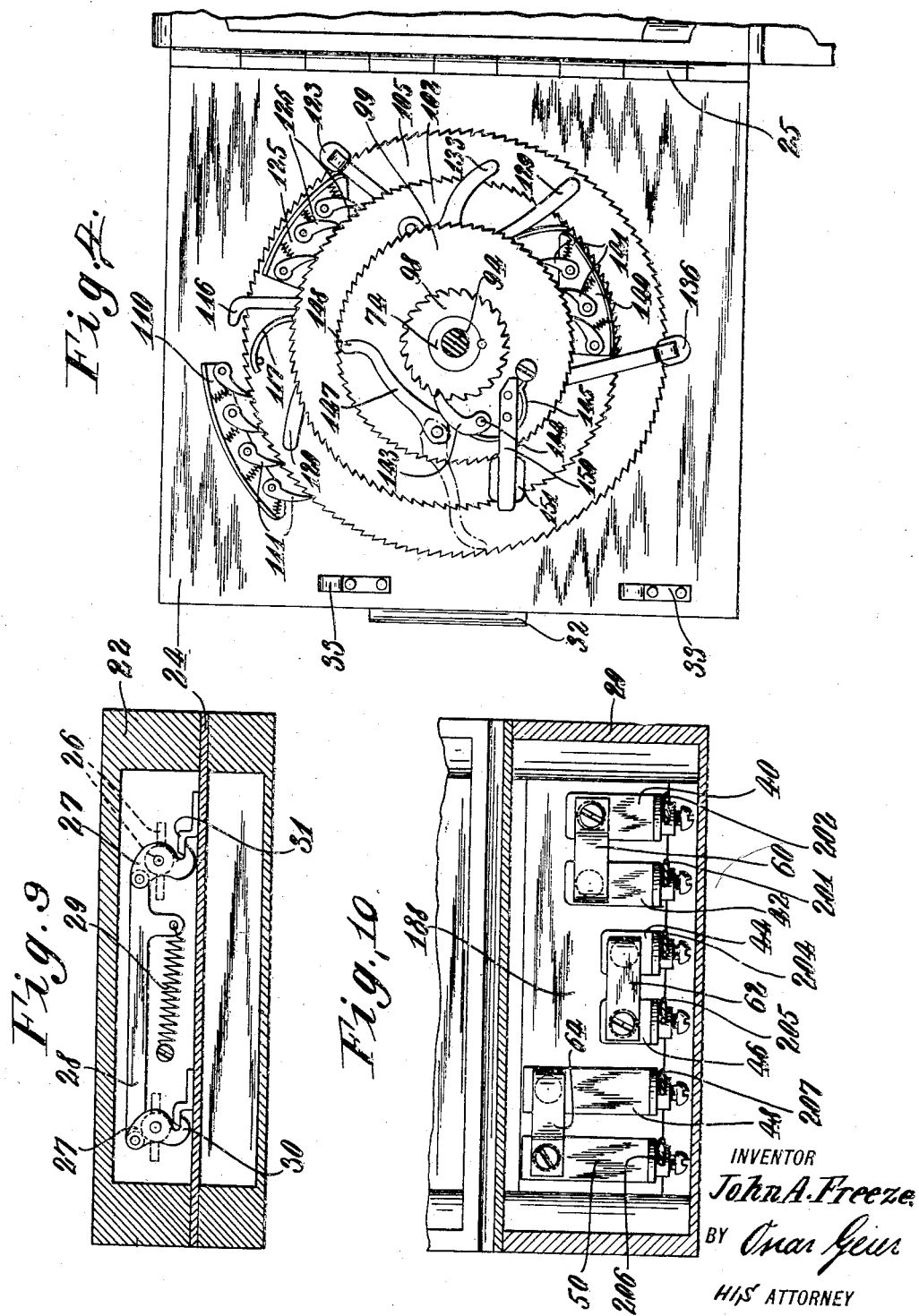

J. A. FREEZE.
AUTOMOBILE SWITCH.
APPLICATION FILED AUG. 1, 1917.
1,381,409.
Patented June 14, 1921.
5 SHEETS—SHEET 4.
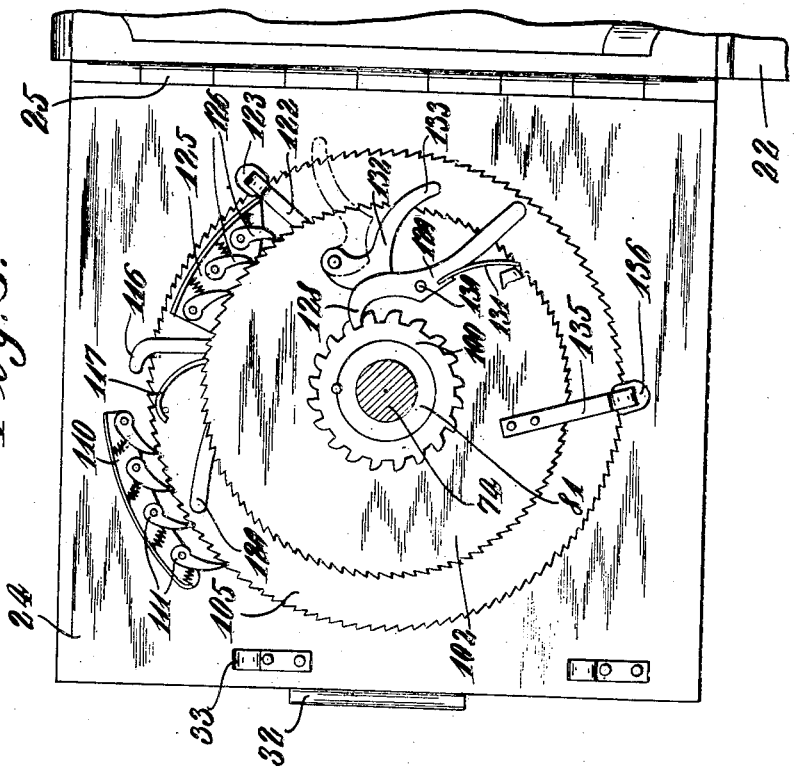
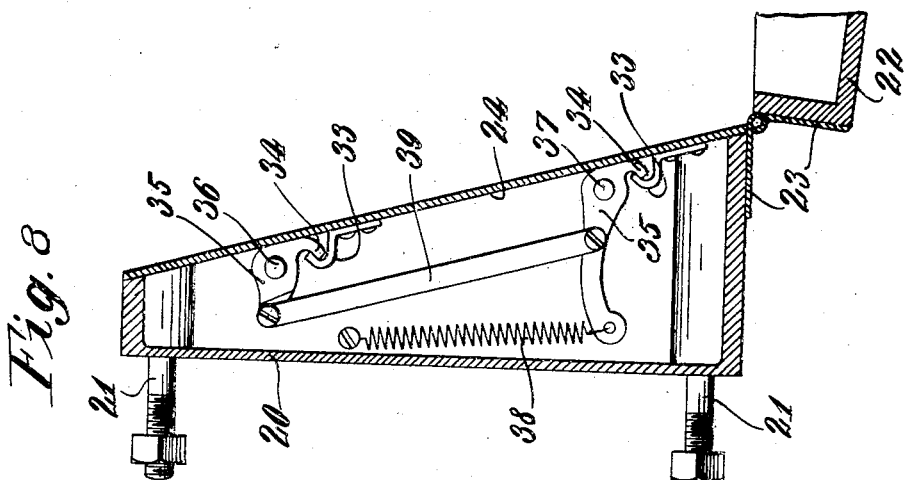
INVENTOR
John A. Freeze
BY 
HIS ATTORNEY

J. A. FREEZE.
AUTOMOBILE SWITCH.
APPLICATION FILED AUG. 1, 1917.

1,381,409.

Patented June 14, 1921.
5 SHEETS—SHEET 5.

INVENTOR
John A. Freeze.
BY Oscar Gill
HIS ATTORNEY

UNITED STATES PATENT OFFICE.

JOHN A. FREEZE, OF SAYREVILLE, NEW JERSEY, ASSIGNOR OF ONE-HALF TO MORRIS RUMPER, OF NEW YORK, N. Y.

AUTOMOBILE-SWITCH.

1,381,409.      Specification of Letters Patent.      Patented June 14, 1921.

Application filed August 1, 1917. Serial No. 183,854.

*To all whom it may concern:*

Be it known that I, JOHN A. FREEZE, a citizen of Poland, resident of Sayreville, county of Middlesex, and State of New Jersey, have invented certain new and useful Improvements in Automobile-Switches, of which the following is a specification.

This invention relates to improvements in means for preventing the unauthorized use of automobiles and other like mechanisms the operation of which depends upon the use of an electric current.

The principal object of the invention is to provide means which may be conveniently arranged within ready access of the operator, which will connect or disconnect the circuit from the source of electric power to the motor, means to sound an audible alarm and show a visible signal becoming operative by surreptitious attempts at starting the mechanism.

A further object is to provide such means in forms which are very compact and easily applied without material change in the construction of the vehicle, and finally, to provide a mechanism which is operated without the use of keys or other extraneous parts, through a novel form of combination lock, the proper manipulations of which is known only to the operator.

These and other like objects are attained by the novel construction and combination of parts hereafter described and shown in the accompanying drawings, forming a material part of this disclosure, and in which—

Fig. 3 is a front plan view of the combination lock as arranged within the casing, the cover of which is shown in an open position.

Fig. 4 is a partial sectional and plan view, the section being taken on line 4—4 of Fig. 7.

Fig. 5 is a similar view, the section being taken on line 5—5 of Fig. 7.

Fig. 8 is a transverse sectional view of the casing with the cover in open position.

Fig. 9 is a horizontal sectional view taken on a line adjacent the upper end of the casing.

Fig. 10 is a transverse sectional view taken on line 10—10 of Fig. 7.

Figure 1:
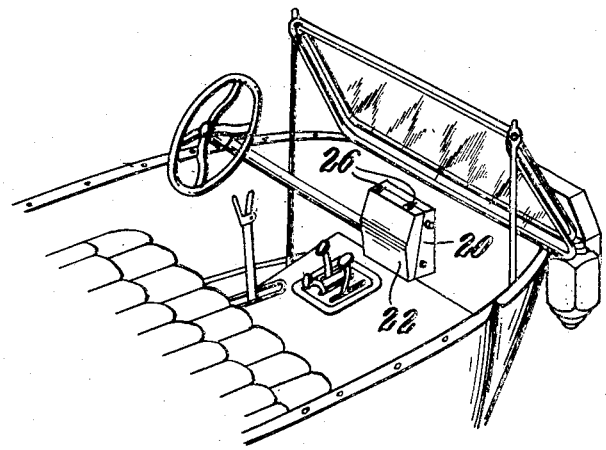
Figure 1 is a fragmental perspective view showing the application of the lock to a conventional type of automobile or like apparatus.
Figure 2:
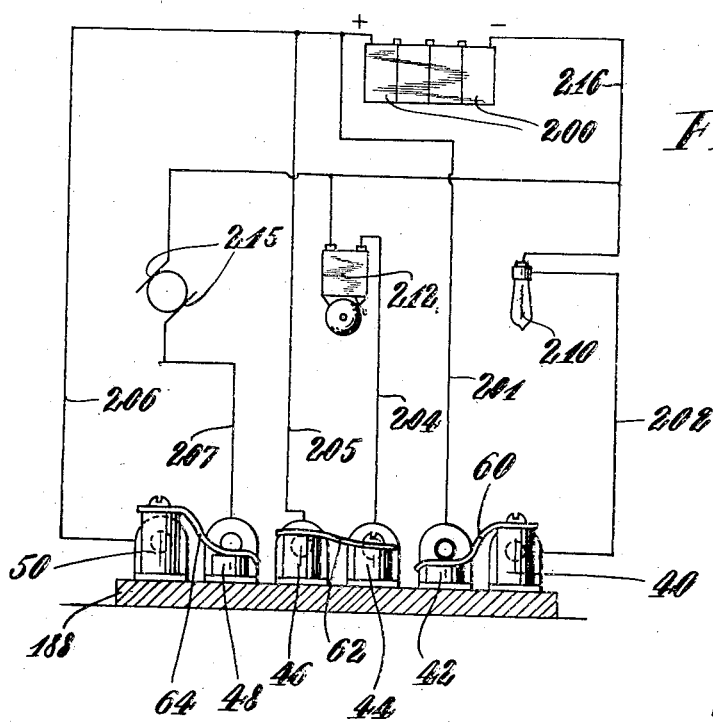
Fig. 2 is a diagrammatic view indicating the electric connections and wiring.

The invention comprises a rectangular metallic casing 20, from which extends securing means 21, adapted to rigidly engage the casing with any convenient support, the casing having a hollow cover 22, secured by hinges 23 at the bottom, while interposed between the casing and cover is an obliquely disposed plate 24, engaged to the casing by transversely disposed hinges 25.

A pair of knobs or similar extensions 26 pass through the top of the cover 22, their inner ends being firmly secured to the hubs of levers 27, which are connected together at one end by a link 28, and drawn into operative position by the coiled spring 29, the opposite end of the levers being formed into hooks 30, engageable with catches 31 secured to the plate 24, the arrangement being such that by partially rotating the extending knobs 26, as to lock or unlock the cover with respect to the plate.

This plate is provided with a projection 32 opposite to its hinges and by means of which it may be operated. The plate is held in a locked position by catches 33 disposed upon its opposite side and engageable with the hooks 34 of levers 35, pivoting upon the stems of knobs 36 and 37, the latter of which projects through the side of the casing 20 and is provided with an operating head as indicated.

Both of these levers are connected by a link 39, while the extended end of one of the levers 35 is engaged with a pull spring 38, adapted to hold the hooks normally in engagement with the catches 33, thus forming a casing which may be readily opened or held in a closed position.

Binding posts are arranged in pairs within the lower side of the casing 20, on an insulating plate 188, the first pair 40 and 42 being engageable by the spring contact 60, current from the battery 200 passing through the wire 201 to the post 42 and from the post 40 through the wire 202 and through the electric lamp 210 on its return. Another wire 205 from the battery is engaged with the post 46, the return current from the post 44 when engaged by the spring contact 62, passing through the wire 204 to the bell 212 and wire 216 to the battery, while a third current from the battery 200 passes through the wire 206 to the post 50, the return from the post 48 passing through the wire 207, and motor 215 on its return to the battery, the posts 48 and 50 being engageable by the contact spring 64 each pair of wires being held in a single insulating cable connecting with the sleeves 68.

Contact is made between each of the several pairs of posts so as to actuate the lamp, bell or spark plugs, respectively in the following manner:

A knob 70, formed with a disk 71 bearing upon its exposed side a plurality of numerals 72, is formed with a stem 74, extending through the plate 24, the disk 71 resting upon a ball-bearing 75, the groove of which is partially formed in an underlying disk 78, having upon its exposed surface a plurality of numerals 80, and formed with a sleeve 81, surrounding the post 74, a third disk 90 encircles the sleeve 81 of the intermediate disk, the disk 90 being mounted upon a roller bearing 92 resting on the face of the plate 24.

All of these several disks are held in proper operative relation by means of the central stud 74, maintained in position by the screw 94, passing through a washer 95, which also holds in position the small toothed disk 98, pressed against the toothed ratchet plate 99, beyond which a similar toothed disk 100, pressing against a second toothed ratchet plate 102, rearwardly of which is a third toothed disk 104, pressing against a third ratchet plate 105, adjacent to the plate 24.

All the several ratchet disks are rotatably arranged upon the sleeves and stud, the disk 98 being keyed to the stud 74, the disk 100 keyed to the sleeve 81, and the third disk 104, keyed to the sleeve 93, so that as the knob 70 and outer numbered disks are rotated, the inner disks are actuated.

Upon the lower side of the plate 24 is fixed a segmental plate 110, upon the surface of which is pivotally secured a plurality of spring impelled dogs 111, the same being arranged so as to drop consecutively into the teeth of the ratchet 105, dividing the length of the teeth into as many parts as there are dogs, thereby preventing any lost action in its motion.

Motion is communicated to the ratchet 105 through the disk 104, by means of the pawl 112, engageable with the teeth, the pawl forming a part of the lever 114, pivoted at 115 on the surface of the ratchet plate, the lever having a protruding handle 116, by which the pawl 112 may be disengaged, it being normally held in engagement by the spring 117, and may be maintained in rigid engagement by the detent 119, the handle 120 of which extends outwardly in position to be operated.

Also upon the side of the ratchet 105 is an arm 122, carrying at its end an insulated contact block 123, the same being shaped and arranged to register with the spring contact 64, and by means of which the terminal contacts 48 and 50 may be brought into electrical engagement.

Also engaged upon the side of the ratchet 105 is a segmental plate 125 upon which are pivotally mounted spring impelled dogs 126, arranged in the manner before described with reference to the teeth in the ratchet plate 102, these teeth being formed reversely to those on the ratchet plate 105, the ratchet plate 102 being rotatable through the disk 100 by means of the pawl 128 formed with the lever 129, pivoted at 130 and held normally in engagement by means of the spring 131 and also capable of being locked therein by the lever 132, the end 133 of which projects outwardly so as to be readily operated.

Secured upon the outer side of the ratchet disk 102 is an arm 135, carrying an insulating contact block 136 engageable with a resilient spring contact element 62, whereby the posts 44 and 46 may be electrically engaged.

Fastened to the outer surface of the ratchet 102, is a third arcuate plate 140, upon which are pivotally engaged spring actuated dogs 141, engaging with the teeth of the third ratchet plate 99, the teeth of the same being formed in the manner of the first ratchet 105 and reversely to the teeth of the ratchet 102, the smaller and last named ratchet plate 99 being rotatable through the toothed disk 98, engaged with the teeth of which is a pawl 143, pivoted upon a pin 144, and held in normal engagement by means of a curved flat spring 145, and capable of being held in rigid engagement by means of the lever 147, the extending end 148 of which is readily accessible.

Figure 6:
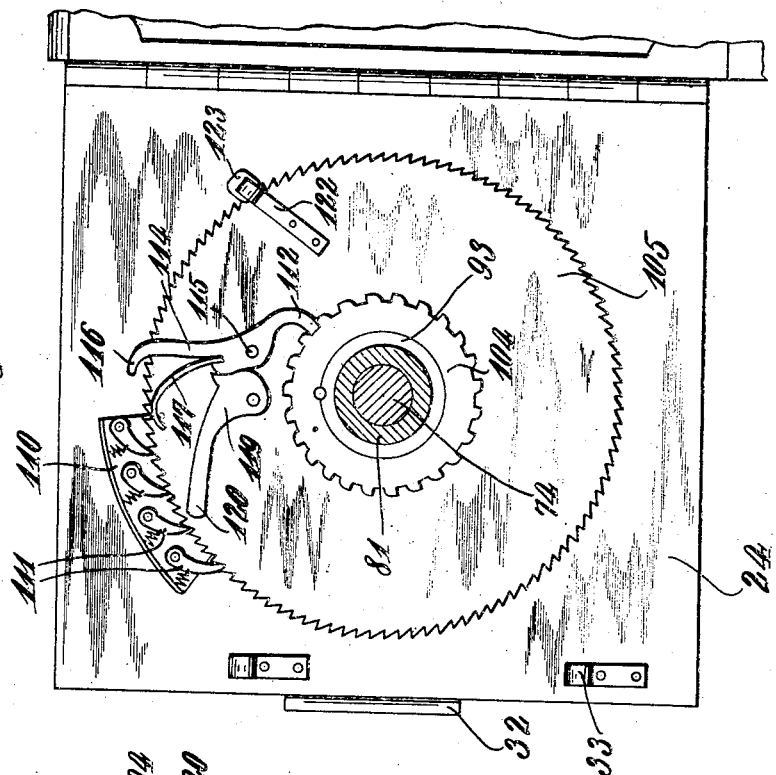
Fig. 6 is a like plan and sectional view, the section being taken on line 6—6 of Fig. 7.
Figure 7:
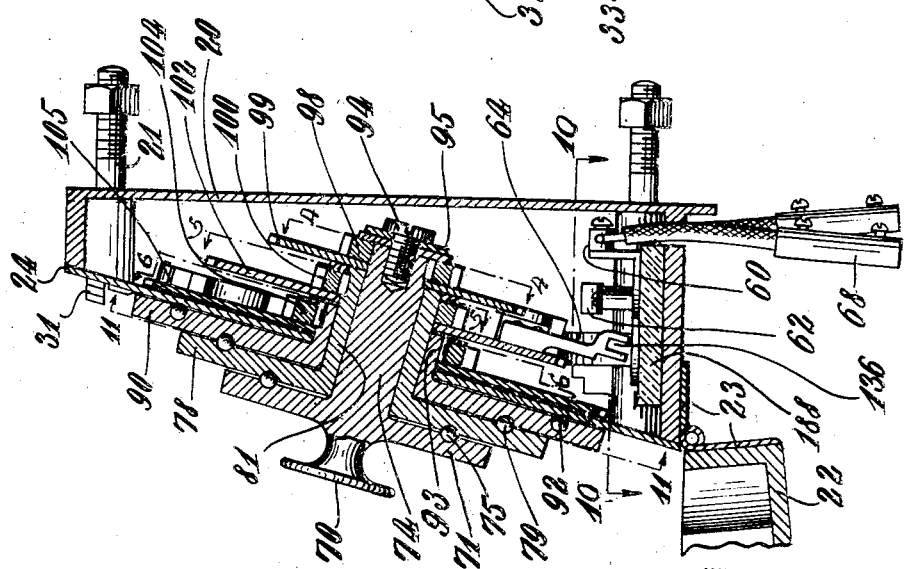
Fig. 7 is a vertical sectional view taken on line 7—7 of Fig. 3.

Secured upon the side of the ratchet plate 99 is an arm 150, carrying an insulated block 151, adapted to make engagement with the contact spring extending between the posts or terminals 44 and 46, the general arrangement of the disks and ratchets being best seen in Figs. 5, 6 and 9.

From the foregoing it will be understood that the relative position of the contact blocks 123, 136, and 151, to the disks 71, 78, and 90, may readily be changed by properly manipulating the levers 120, 129, and 148, their actuation permitting relocating the ratchet wheels 105, 102, and 99 with reference to their actuating disks so that a new combination may be readily effected at any desired time, and by the peculiar arrangement of the dogs or pawls all lost motion is reduced to a negligible amount.

As it will be found desirable to change the combination frequently in order to prevent unauthorized persons who may have gained knowledge of the combination to use this knowledge to start the car the contact blocks of the single switch must change their relative positions to the numbered disks and this is effected by the operation of, for instance, the protruding handle 116 allowing by the intermediary of the disk 104 a rotation of the ratchet 105 and therefore a change of the position or contact blocks 123 in respect to the numbered disks.

It will be clear that the mechanism should be accessible at all times for the purpose of changing the combination and also for the purpose of oiling and cleaning the parts.

In operation, the motor is put into circuit by rotating the disk 90 so as to cause any of the predetermined numerals to register with a mark impressed upon the surface of the cover, at which time the contact block 123 closes the circuit through the posts 48 and 50, starting the motor into operation and it will be clearly understood that a person unfamiliar with the combination is likely to actuate the knob 70 or other of the numbered disks which do not effect the operation of the motor, but causes the bell to ring or the light to be displayed, thereby announcing an unauthorized attempt at operating the car.

From the foregoing description it will be clear that only the owner of a car, who knows exactly which switch is to be operated in order to close the starting circuit will be able to do so, while unauthorized persons will try to manipulate the knob 70 which suggests itself as the manipulator for the circuit closing switch of the starter, which however will simply close a circuit in which a danger signal is located, the actuation of which will indicate the attempt to operate the car by an unauthorized person.

Having thus described my invention, what I claim as new, and desire to secure by Letters Patent, is—

1. An automobile switch of the character described comprising a casing, a plate hinged within said casing, a plurality of electric switch controlling disks, a stem fixedly supporting each disk, sleeved within each other and mounted through the hinged plate rotatably, a ratchet plate mounted upon each stem, means for adjustably locking the ratchet plates to the respective disks and switch engaging arms carried by the ratchet plates.

2. An automobile switch of the character described comprising a casing, a plate hinged within said casing, a plurality of electric switch controlling disks, a stem fixedly supporting each disk, sleeved within each other and mounted through the hinged plate rotatably, a ratchet plate mounted upon each stem, a tensioned dog carried by each ratchet plate for adjustably locking the ratchet plate to its respective disk and switch engaging arms carried by the ratchet plates.

3. In combination with a supporting plate having a central opening and a plurality of concentrically arranged relatively rotatable members projecting through said opening and provided with gradually increasing sized indicator disks upon the outer ends thereof, plates firmly secured to the inner portions of said concentric members, means for releasably clutching any desired ones of said plates to their respective members at will, said plates each having a radially extending actuating arm, the actuating arms of the plates being in different planes, and normally open circuit closers arranged in different planes so as to be each actuated by one of said arms.

In testimony whereof I have affixed my signature.

JOHN A. FREEZE.